G. M. STERNBERG.
ELECTRICAL THERMOSTAT.
No. 105,273.                    Patented July 12, 1870.
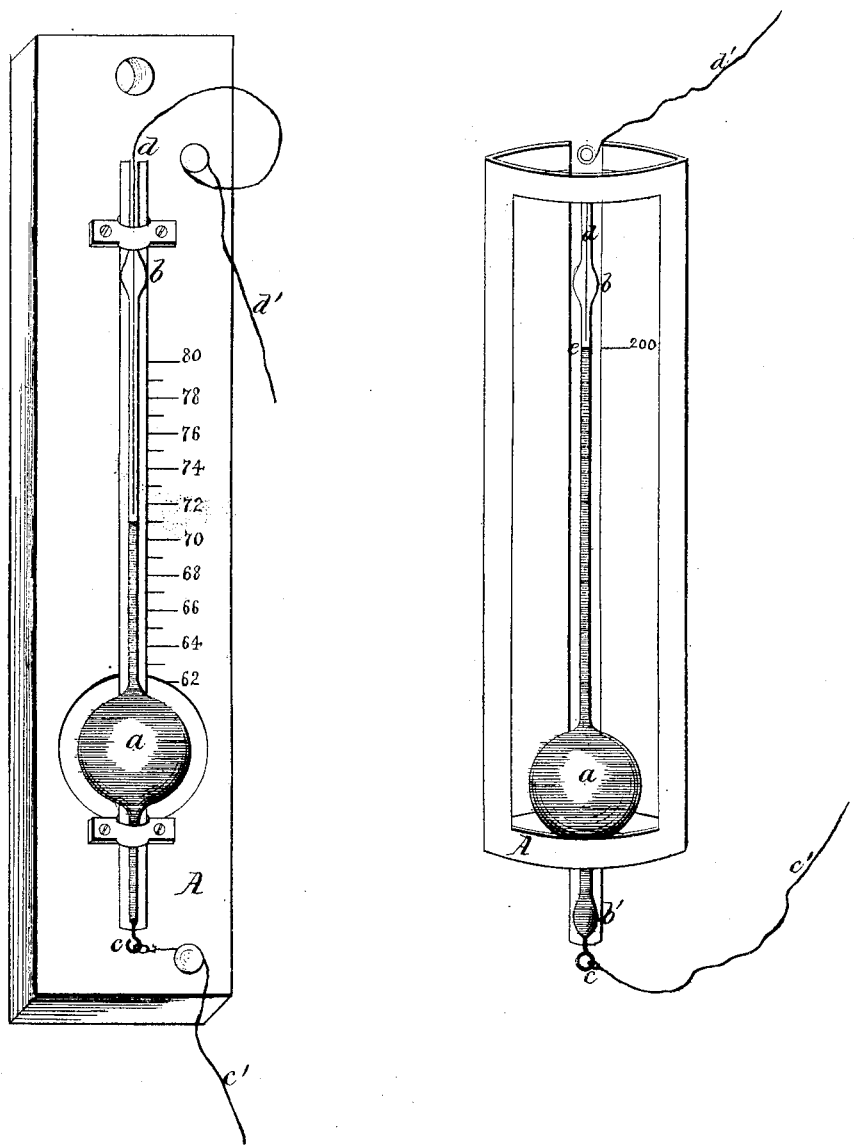
Witnesses.                      Inventor:
Thomas Hooker                   George M. Sternberg
R. L. Lauriston

UNITED STATES PATENT OFFICE.

GEORGE MILLER STERNBERG, OF FORT RILEY, KANSAS.

IMPROVEMENT IN ELECTRICAL THERMOSTATS.

Specification forming part of Letters Patent No. 105,273, dated July 12, 1870.

I, GEORGE MILLER STERNBERG, of Fort Riley, in the county of Davis and State of Kansas, have invented certain Improvements in Heat-Regulating Thermometers, of which the following is a specification, reference being made to the accompanying drawing, forming part of the same.

This invention has for its object the construction of a regulating thermometer, by which, in connection with an apparatus for producing an electrical current and a mechanical apparatus as described in Letters Patent No. 100,462, granted me March 1, 1870, the temperature of any gas or liquid which is being heated by artificial means may be maintained uniformly at any point desired, with but a slight and unimportant fluctuation above or below such point.

Figure 1 is a front view of a regulating thermometer for public buildings, dwelling-houses, hot-houses, drying-kilns, &c. Fig. 2 is a view of the thermometer for regulating the temperature of a liquid undergoing the process of evaporation or distillation.

In the drawing, Fig. 1, A is a supporting-frame, suitable for hanging against the wall of a room. $a$ is the bulb of a thermometer constructed with a dilation in its tube at $b$. The object of this dilation is to allow the thermometer to be constructed with a short tube, as it is not necessary or desirable that it should have a great range. In the figure the range of the thermometer is from 60° to 80° Fahrenheit. When the mercury falls below 60° it sinks into the bulb $a$. When it rises above 80° the dilation $b$ answers as a reservoir for it.

The tube of the thermometer extends a short distance below the bulb $a$, and in this prolongation is hermetically sealed, the wire $c$ having contact with the mercury in the bulb.

The upper end of the thermometer-tube is open, and admits an adjustable wire, $d$, which may be moved up or down in the capillary tube of the thermometer to any desired point.

When the thermometer is interposed in an electrical circuit by means of the wires $c$ $c'$ the circuit is completed whenever the mercury in its tube is in contact with the wire $d$, and is broken whenever such contact ceases, thus regulating the damper or valve operated upon, as fully described in Letters Patent No. 100,462.

Fig. 2 is a representation of a thermometer especially adapted to the regulation of the temperature of any liquid in which it may be immersed, and which it may be desirable to distill or evaporate at a fixed temperature. In this thermometer the wires $c$ and $d$ are both hermetically sealed in their places, and there is a dilation, $b'$, in the portion of the tube below the bulb $a$ similar to the dilation $b$ in the tube above.

This thermometer may be constructed for any given temperature as follows: The wire $c$ is first hermetically sealed in its place. Mercury is then introduced into the bulb $a$ until it contains a little less than would rise to the point $c$ when subjected to the temperature desired. The wire $d$ is then hermetically sealed in its place, while the mercury in the bulb is so heated as to fill the tube of the thermometer and the dilation $b$, thus leaving a vacuum above the mercury, when, upon cooling, it recedes in the tube.

The instrument is corrected so that the mercury shall just touch the point of the wire $d$ when heated to the required temperature by means of the dilation $b'$.

The thermometer being turned upside down and the mercury driven from the dilation $b'$ to fill the dilation $b$, now dependent, sufficient heat is applied to $b'$ to cause the glass to contract, thus decreasing the capacity of $b'$. The thermometer being again placed in its proper position, if the contraction of $b'$ has been sufficient the mercury heated to the desired temperature will just meet the wire $d$. If it does not the dilation $b'$ must again be made to contract by the heat of a blow-pipe flame, and by a careful repetition of the process the desired end may be attained. If the mercury is made to rise above the point of the wire, by heating the tube at $b$ and gently elongating it the point of the wire may be made to recede such a distance as may be necessary to make the correction.

Thermometers may also be constructed to accomplish the same purpose by drilling holes through the side of the thermometer-tube at any desired points and inserting and hermetically sealing therein wires of iron, platinum, or other metal not acted upon by mercury, so that the point of the wires may have contact with the column of mercury as it rises in the tube.

Having thus described my invention, what I claim as new, and desire to secure by Letters Patent, is—

1. A thermometer, constructed with a prolongation of its tube below the bulb $a$, in which is hermetically sealed the wire $c$, and with the dilation $b$ and the adjustable wire $d$, substantially as and for the purpose hereinbefore set forth.

2. A thermometer constructed with the dilations $b$ and $b'$ and the hermetically-sealed wires $c$ and $d$, substantially as and for the purpose hereinbefore set forth.

GEO. M. STERNBERG.

Witnesses:
 THOMAS HOOKEY,
 R. HAMENSON.